(12) United States Patent
Shibaike et al.

(10) Patent No.: US 12,745,282 B2
(45) Date of Patent: Sep. 22, 2026

(54) TERMINAL AND COMMUNICATION METHOD

(71) Applicant: NTT DOCOMO, INC., Tokyo (JP)

(72) Inventors: Naoya Shibaike, Chiyoda-ku (JP); Hiroki Harada, Chiyoda-ku (JP); Satoshi Nagata, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 286 days.

(21) Appl. No.: 18/286,449

(22) PCT Filed: Mar. 23, 2022

(86) PCT No.: PCT/JP2022/013583

§ 371 (c)(1),
(2) Date: Oct. 11, 2023

(87) PCT Pub. No.: WO2022/244457

PCT Pub. Date: Nov. 24, 2022

(65) Prior Publication Data

US 2024/0196432 A1 Jun. 13, 2024

(30) Foreign Application Priority Data

May 21, 2021 (JP) ................................ 2021-086290

(51) Int. Cl.
*H04W 74/0808* (2024.01)
*H04B 7/06* (2006.01)
*H04W 16/14* (2009.01)

(52) U.S. Cl.
CPC .... *H04W 74/0808* (2013.01); *H04B 7/06968* (2023.05); *H04W 16/14* (2013.01)

(58) Field of Classification Search
CPC . H04W 74/0808; H04W 74/08; H04W 16/14; H04W 16/28; H04W 72/04;
(Continued)

(56) References Cited

U.S. PATENT DOCUMENTS

2021/0045076 A1* 2/2021 Tomeba .............. H04W 56/001
2022/0124796 A1* 4/2022 Salem ................... H04W 74/02
(Continued)

FOREIGN PATENT DOCUMENTS

JP 2019-140436 A 8/2019
WO 2019156082 A1 8/2019
(Continued)

OTHER PUBLICATIONS

International Search Report issued in PCT/JP2022/013583 on Jun. 7, 2022 (5 pages).

(Continued)

*Primary Examiner* — Sujoy K Kundu
*Assistant Examiner* — Vladislav Y Agureyev
(74) *Attorney, Agent, or Firm* — Osha Bergman Watanabe & Burton LLP

(57) ABSTRACT

The terminal includes a reception unit that performs LBT (listen before talk), a transmission unit that performs transmission within COT (channel occupancy time) acquired based on a result of the LBT, and a control unit that determines a spatial filter to be applied to a sensing beam used for the LBT, based on a spatial filter to be applied to the transmission.

6 Claims, 10 Drawing Sheets

(58) Field of Classification Search
CPC . H04W 72/54; H04B 7/06968; H04B 7/0695; Y02D 30/70
See application file for complete search history.

(56) References Cited

U.S. PATENT DOCUMENTS

| | | | | |
|---|---|---|---|---|
| 2022/0200680 | A1* | 6/2022 | Farag | H04B 7/0617 |
| 2022/0224479 | A1* | 7/2022 | He | H04L 5/0044 |
| 2022/0287093 | A1* | 9/2022 | Iyer | H04W 74/0808 |
| 2022/0394684 | A1* | 12/2022 | Zhang | H04W 28/0236 |
| 2023/0093299 | A1* | 3/2023 | Yoshimura | H04L 5/0082 370/329 |
| 2023/0128924 | A1* | 4/2023 | Ganesan | H04W 74/006 370/329 |
| 2023/0156681 | A1* | 5/2023 | Tooher | H04W 72/542 370/329 |
| 2023/0164835 | A1* | 5/2023 | Ganesan | H04W 74/0808 370/329 |
| 2023/0262678 | A1* | 8/2023 | Fan | H04B 7/0695 370/329 |
| 2023/0283430 | A1* | 9/2023 | Zhu | H04L 5/0051 370/329 |
| 2023/0361827 | A1* | 11/2023 | Fan | H04B 7/0617 |
| 2024/0063971 | A1* | 2/2024 | Liu | H04L 5/0051 |
| 2024/0129959 | A1* | 4/2024 | MolavianJazi | H04L 5/0053 |
| 2024/0314767 | A1* | 9/2024 | Zhang | H04B 7/088 |

FOREIGN PATENT DOCUMENTS

| | | | | |
|---|---|---|---|---|
| WO | 2021063125 | A1 | 4/2021 | |
| WO | WO-2021108817 | A2 * | 6/2021 | H04B 7/06952 |
| WO | WO-2021159292 | A1 * | 8/2021 | H04W 16/28 |
| WO | WO-2021191847 | A1 * | 9/2021 | H04W 72/23 |
| WO | WO-2021214709 | A1 * | 10/2021 | H04W 74/0808 |
| WO | WO-2022151299 | A1 * | 7/2022 | H04W 72/04 |
| WO | WO-2022237745 | A1 * | 11/2022 | H04B 7/06966 |

OTHER PUBLICATIONS

Written Opinion of the International Searching Authority issued in PCT/JP2022/013583 on Jun. 7, 2022 (4 pages).

3GPP TS 38.306 V16.4.0; "3rd Generation Partnership Project; Technical Specification Group Radio Access Network; NR; User Equipment (UE) radio access capabilities (Release 16)"; Mar. 2021 (151 pages).

3GPP TS 38.300 V16.5.0; "3rd Generation Partnership Project; Technical Specification Group Radio Access Network; NR; NR and NG-RAN Overall Description; Stage 2 (Release 16)"; Mar. 2021 (151 pages).

Office Action issued in counterpart Japanese Patent Application No. 2023-522284 mailed on Oct. 7, 2025 (4 pages).

Search report issued in Chinese Patent Application No. 202280034134.8, mailed on Aug. 4, 2026 (17 pages).

* cited by examiner

FIG.6

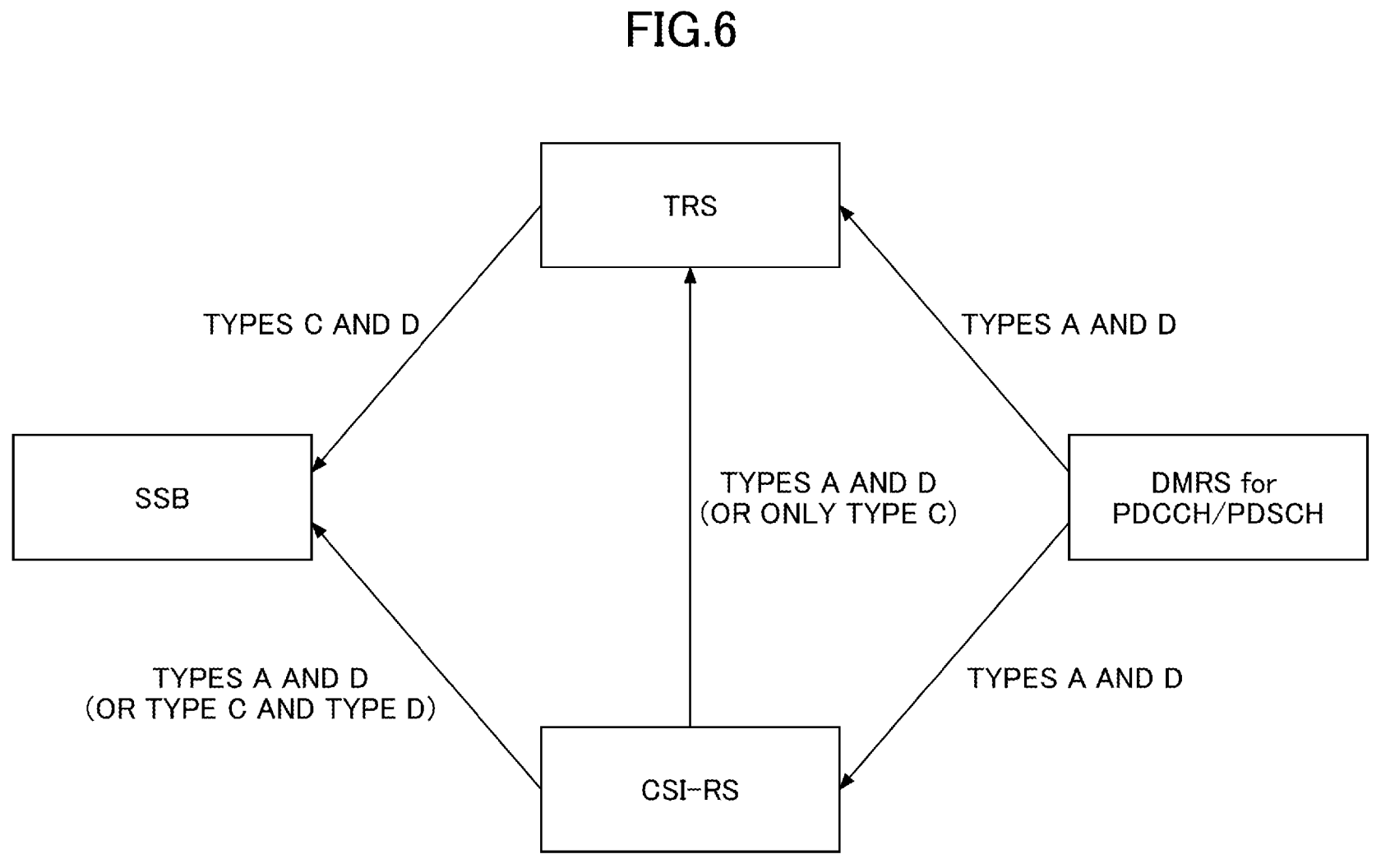

DMRS for PDCCH/PDSCH

TYPES A AND D

TYPES A AND D

TRS

TYPES A AND D (OR ONLY TYPE C)

CSI-RS

TYPES C AND D

TYPES A AND D (OR TYPE C AND TYPE D)

SSB

FIG.7

SRS

PUSCH

SSB/CSI-RS

PUCCH

TERMINAL AND COMMUNICATION METHOD

FIELD OF THE INVENTION

The present invention relates to a terminal and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example, Non-Patent Document 1).

NR release 17 discusses using a higher frequency band than a conventional release (e.g., Non-Patent Document 2). For example, applicable numerologies including subcarrier spacings, channel bandwidths, etc., physical layer design, and possible failures in actual wireless communication in the 52.6 GHz to 71 GHz frequency band have been discussed.

CITATION LIST

Non-Patent Document

Non-Patent Document 1: 3GPP TS 38.300 V16.5.0 (2021-03)

Non-Patent Document 2: 3GPP TS 38.306 V16.4.0 (2021-03)

SUMMARY OF THE INVENTION

Technical Problem

It has been necessary to determine a sensing beam to be applied to the LBT (Listen before talk) to be executed for channel access in a frequency band using newly operated frequencies that are higher than the conventional frequencies.

The present invention has been made in view of the above points, and a sensing beam to be applied to the LBT (Listen before talk) can be determined in a wireless communication system.

Solution to Problem

According to the disclosed technology, a terminal is provided. The terminal includes: a reception unit that performs LBT (Listen before talk); a transmission unit that performs transmission within a COT (Channel Occupancy Time) acquired based on a result of the LBT; and a control unit that determines a spatial filter to be applied to a sensing beam used for the LBT, based on a spatial filter to be applied to the transmission.

Advantageous Effects of Invention

According to the disclosed technique, a sensing beam to be applied to LBT (Listen before talk) can be determined in the wireless communication system.

BRIEF DESCRIPTION OF THE DRAWINGS

FIG. 6 is a drawing illustrating an example (1) of a QCL relationship in an embodiment of the present invention.

FIG. 7 is a drawing illustrating an example (2) of a QCL relationship in an embodiment of the present invention.

DETAILED DESCRIPTION OF THE PREFERRED EMBODIMENTS

Figure 1:
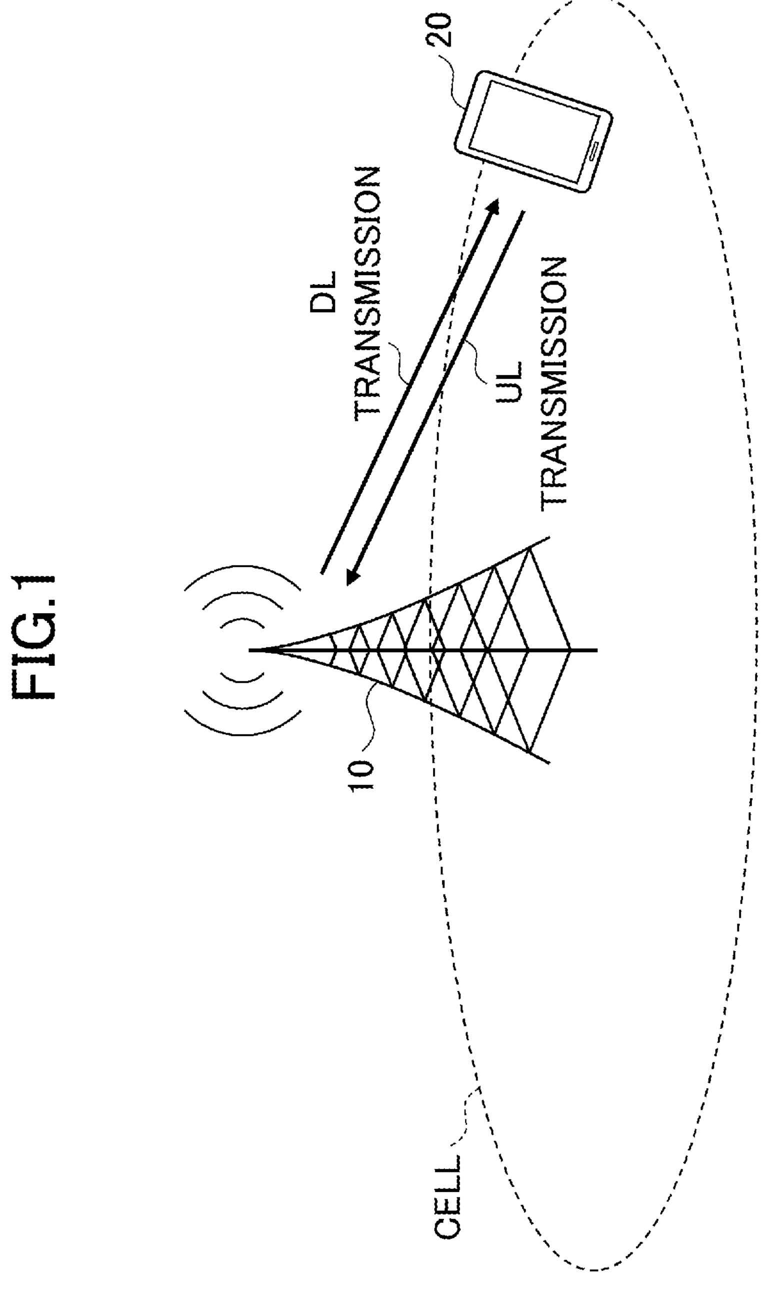
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the specification has, unless otherwise specifically present mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a configuration example of a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that one more provides or cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of subcarriers or resource blocks. The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (SCell: Secondary Cell) and a primary cell (PCell: Primary Cell) using CA (Carrier Aggregation). In addition, the terminal 20 may perform communications via a primary cell of the base station 10 and a primary secondary cell group cell (PSCell: Primary SCG Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals.

Figure 2:
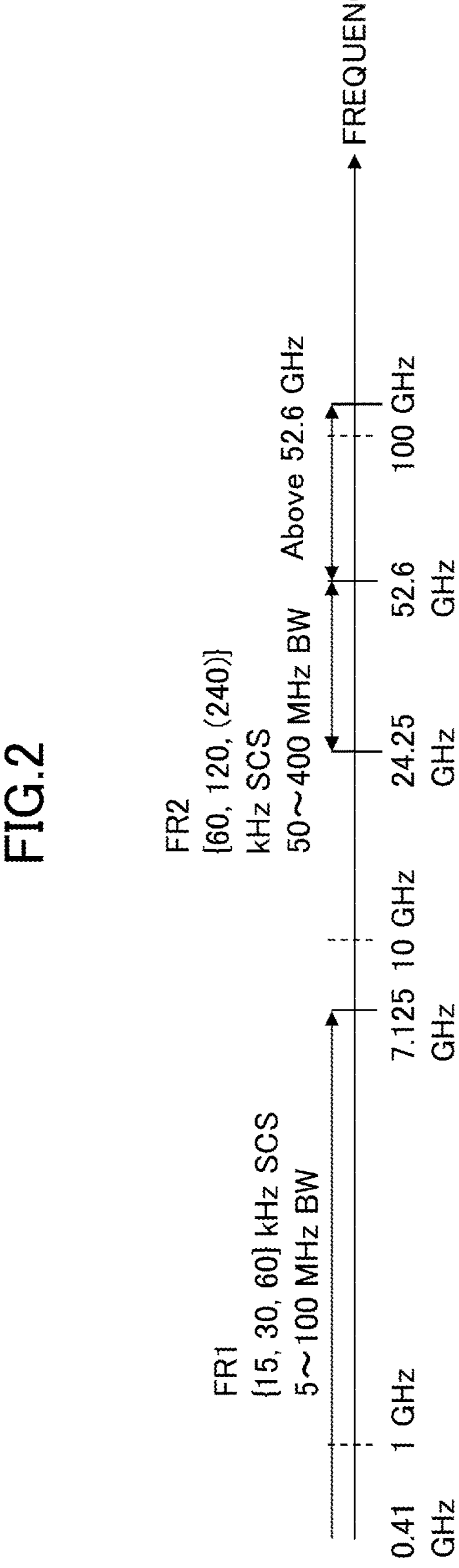
FIG. 2 is a drawing illustrating an example of a frequency range according to an embodiment of the present invention.

FIG. 2 is a drawing illustrating an example of a frequency range according to an embodiment of the present invention. In the NR specifications of 3GPP Release 15 and Release 16, for example, an operation in a frequency band of 52. 6 GHz or more has been discussed. Note that, as shown in FIG. 2, FR (Frequency range) 1 in which current operation is defined is a frequency band from 410 MHz to 7. 125 GHZ, SCS (Sub carrier spacing) is 15, 30 or 60 kHz, and bandwidth is from 5 MHz to 100 MHz. FR2 is a frequency band from 24. 25 GHz to 52. 6 GHz, SCS is 60, 120 or 240 kHz, and bandwidth is from 50 MHz to 400 MHz. For example, the newly operated frequency band may be assumed to be from 52.6 GHz to 71 GHZ, may assumed to be from 52.6 GHz to 114.25 GHZ, or may include an unlicensed band or a no-license-required band.

As the regulation in the above-described frequency band, for example, in CEPT (European Conference of Postal and Telecommunications Administrations), there is a regulation in which LBT (Listen before talk) is performed as mandatory. Also, there is a regulation that requires LBT not to be performed. Which regulation is to be used is determined by, for example, mobility of the terminal 20, such as whether the terminal 20 is a fixed terminal or a mobile terminal.

Further, for example, in FCC (Federal Communications Commission), requirements for reducing interference are not specified in the 57-71 GHz band. For example, in Japanese regulations, carrier sensing is required as essential before starting transmission with transmission power exceeding 10 mW. Note that the carrier sensing has a mechanism similar to that of LBT, but details have not been determined.

Also, in 3GPP, it is being discussed to support both channel access with LBT execution and channel access without LBT execution at the time when the base station 10 or the terminal 20 starts channel occupancy. In addition, with respect to the LBT mechanism, omni-directional LBT, directional LBT, and an LBT type mechanism executed by the receiver are being discussed.

In addition, the necessity of limiting the operation of channel access that does not execute LBT is being discussed. For example, in order to satisfy the regulation, the necessity of limiting the operation of channel access that does not execute LBT is being discussed in a case where there are ATPC (Automatic Transmit Power Control), DFS (Dynamic Frequency Selection), long-term sensing, or other interference reduction mechanisms.

In addition, a mechanism or condition for switching between channel access with LBT execution and channel access without LBT execution (e.g., an assumption of being permitted by local regulations) is being discussed.

For example, in the 60 GHz band, it is being discussed to support two media access mechanisms: channel access with LBT execution; and channel access without LBT execution.

For example, it is being discussed to support three types of channel access: no LBT; long term sensing; and short term sensing. For example, no LBT may be applied in a case where EIRP (Equivalent Isotopically Radiated Power), transmission power, duty cycle of channel occupancy, characteristics related to spatial multiplexing, or the like, satisfies a condition. In addition, the long term sensing provides an approach of allowing beams to be reused in a case where many beam collisions occur. The short term sensing is a kind of LBT.

In addition, for example, regarding the channel access method, there are four categories defined in 3GPP as shown below.

Category 1) Perform transmission without LBT execution.

Category 2) Perform carrier sensing before transmission in a fixed sensing period, and perform transmission in a case where a channel is available.

Category 3) Generate a random value (random back-off) from a predetermined range before transmission, repeat carrier sensing with a fixed sensing slot time, and perform transmission in a case where the generated value amount of channels are available.

Category 4) Generate a random value (random back-off) from a predetermined range before transmission, repeat carrier sensing with a fixed sensing slot time, and perform transmission in a case where the generated value amount of channels are available. The range for generating the random back-off value can be changed according to the communication failure situation due to the collision with communications of other systems.

In addition, for example, there are LBT types 1) to 3) shown below.

1) LBT with randomly determined sensing duration. For example, corresponding to the type 1 LBT in Release 16 NR-U (NR system using an unlicensed band). The possibility of transmission collision between multiple devices is low, but the transmission timing delay occurs due to the back-off. The type 1 LBT may be referred to as the type 1 channel access.
2) LBT with fixed sensing duration. For example, corresponding to the type 2a/2b LBT in release 16 NR-U. The possibility of transmission collision between multiple devices is high, but the transmission timing delay is small because of no back-off. The type 2a/2b LBT may be referred to as the type 2a/2b channel access.
3) No sensing and immediate transmission. For example, corresponding to the type 2c LBT in release 16 NR-U. The above transmission method may be referred to as the type c channel access.

Here, in release 16 NR-U, COT (Channel Occupancy between gNB UE under Time) sharing and is allowed limitations. The predetermined limitations predetermined include, for example, transmission periods, transmission signals, transmission channel types, and priority classes.

Figure 3:
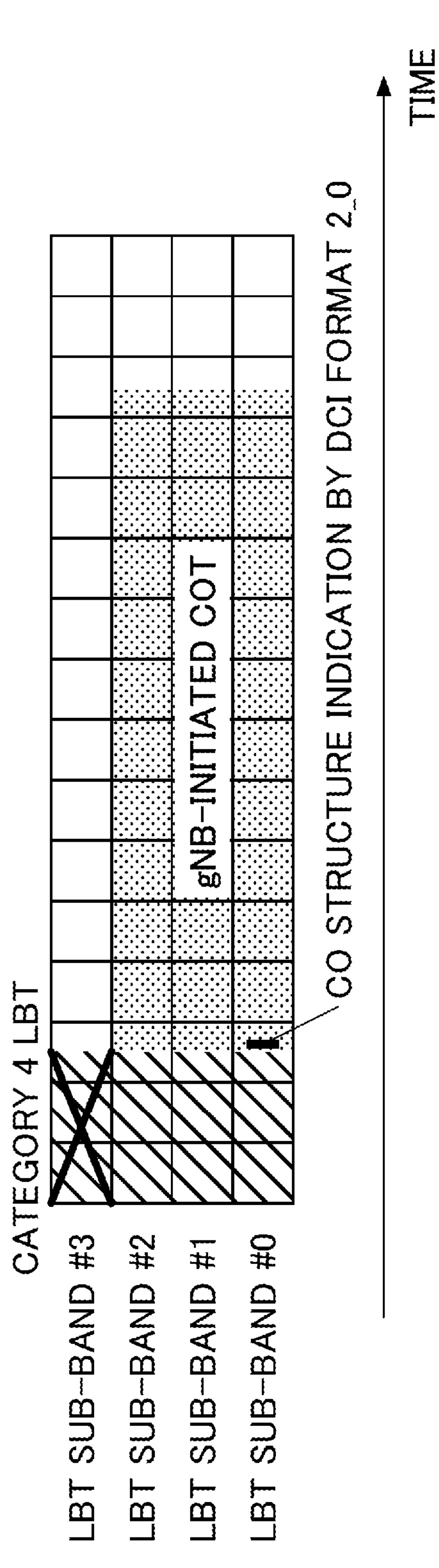
FIG. 3 is a drawing illustrating an example of LBT in an embodiment of the present invention.

FIG. 3 is a drawing illustrating an example of LBT in an embodiment of the present invention. As illustrated in FIG. 3, the gNB performs the category 4 LBT in LBT sub-channel #0, LBT sub-channel #1, LBT sub-channel #2 and LBT sub-channel #3. In FIG. 3, in LBT sub-channel #3, a signal is detected and the channel is not occupied. As illustrated in FIG. 3, the gNB-initiated COT includes LBT sub-channel #0, LBT sub-channel #1 and LBT sub-channel #2. Information related to COT (CO structure, for example, available LBT sub-band, COT duration) is indicated to the UE group via DCI format 2_0.

In a case where the upper layer parameter "availableRB-SetPerCell-r16" is configured, the information related to COT includes the available RB set indicator 1, the available RB set indicator 2, . . . , the available RB set indicator N1.

In a case where the upper layer parameter "CO-Duration-PerCell-r16" is configured, the information related to COT includes the COT duration indicator 1, the COT duration indicator 2, . . . , the COT duration indicator N2.

Figure 4:
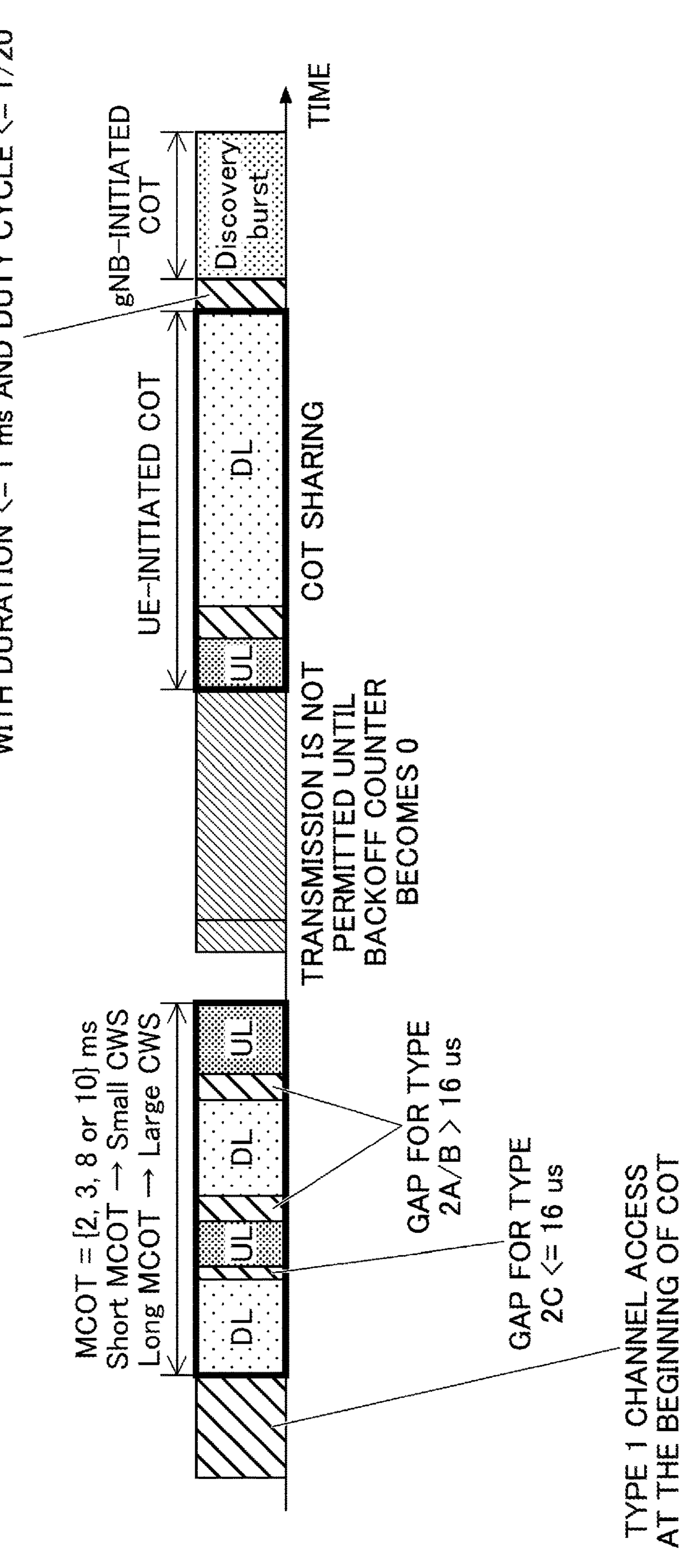
FIG. 4 is a drawing illustrating an example of LBE in an embodiment of the present invention.

FIG. 4 is a drawing illustrating an example of LBE in an embodiment of the present invention. LBE (Load Based Equipment) is an NR-U channel access method in which LBT is performed based on the random back-off and the variable length CWS (Contention Size) Window considering the coexistence with other systems. Note that MCOT (Maximum COT) means a maximum COT.

As illustrated in FIG. 4, at the beginning of COT, the type 1 channel access is performed by the gNB, the gNB-initiated COT is shared with the UE, and DL or UL can be arranged in the COT. MCOT may be 2, 3, 8 or 10 ms. In a case of short MCOT, a small CWS may be configured, and, in a case of long MCOT, a large CWS may be configured. In front of the UL or DL, the gap for type 2c or the gap for type 2A/B is arranged.

In addition, as illustrated in FIG. 4, no transmission is allowed until the back-off counter becomes 0, and then, the Ue-initiated COT is started, and UL and DL can be arranged in COT according to the COT sharing. Thereafter, according to the type 2A channel access, the discovery burst with the duration equal to or less than 1 ms and the duty cycle equal to or less than 1/20, is transmitted in the gNB-initiated COT.

Figure 5:
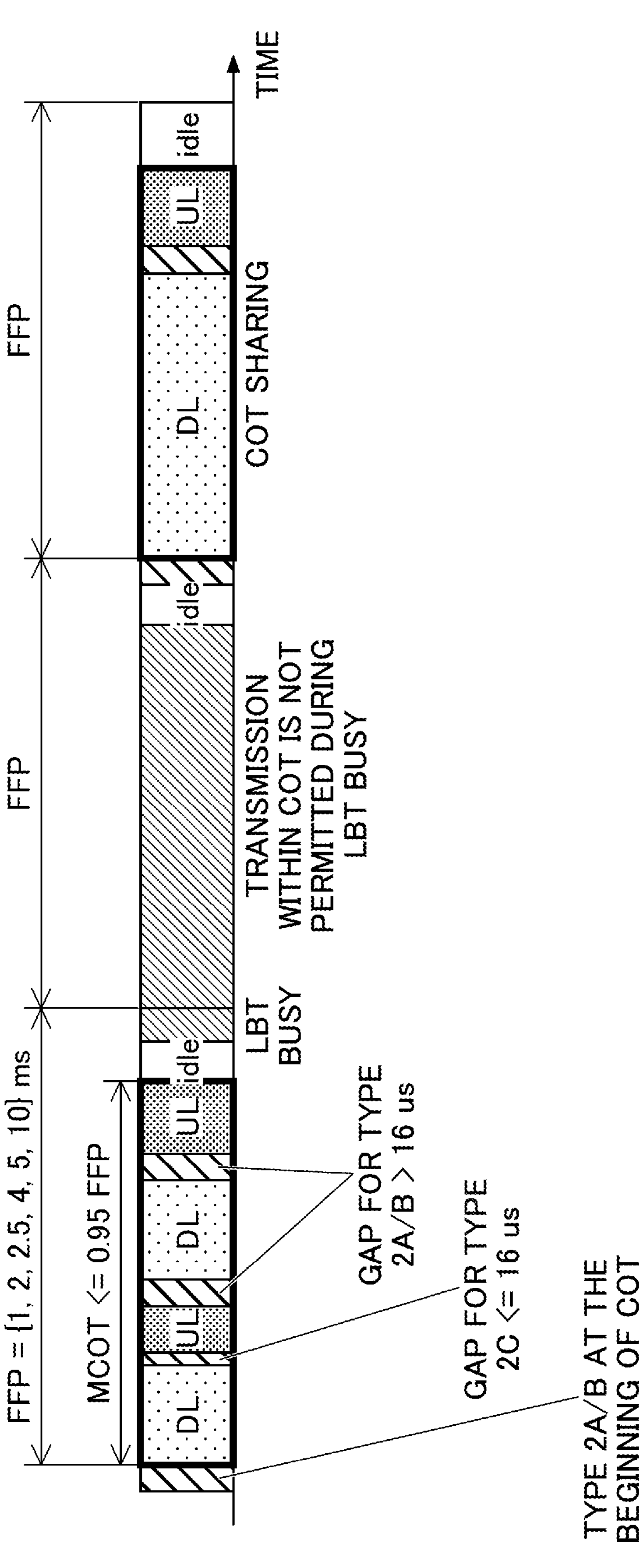
FIG. 5 is a drawing illustrating an example of FBE in an embodiment of the present invention.

FIG. 5 is a drawing illustrating an example of FBE in an embodiment of the present invention. FBE (Frame Based Equipment) is an NR-U channel access method in which LBT is performed based on the fixed carrier sense duration and a predetermined period (FFP: Fixed Frame Period) only in a case where it is guaranteed that there is no other system coexisting on the same frequency due to the regulations, or the like.

As illustrated in FIG. 5, FFP can be configured to be 1, 2, 2.5, 4, 5, or 10 ms, and the MCOT is equal to or less than 0.95 FFP. At the beginning of COT, the type 2A/B channel access is performed, and DL or UL can be arranged in the COT according to the COT sharing. In front of the UL or DL, the gap for type 2c or the gap for type 2A/B is arranged.

In the subsequent FFP, transmission is not allowed in the COT because of the LBT busy. In the subsequent FFP, COT is acquired by LBT, and DL or UL can be arranged in the COT according to the COT sharing.

For example, all beams used in the COT may be covered by the wide beam that is applied to LBT at the beginning of COT. In addition, with respect to the beams used in the COT, the independent per-beam LBT may be performed at the beginning of COT.

The sensing beam "covers" the transmission beam may mean that the angle of the beam width of the transmission beam with a predetermined power is included in the beam width of the sensing beam with a predetermined power.

In addition, with respect to the correspondence relationship between the sensing beam and the transmission a QCL (Quasi-co-location)/TCI (Transmission beam, new configuration indicator) framework may be introduced. For example, the sensing beam may be defined to be corresponding to the transmission beam in a case where the sensing beam gain in the peak transmission direction is within X dB of the transmission beam gain.

In addition, for example, the sensing beam gain may be measured in one or more directions where the transmission beam EIRP is within A dB of the peak transmission beam gain, and the sensing beam may be defined to be corresponding to the transmission beam in a case where the sensing beam gain is within X dB of the transmission beam gain in those directions.

In addition, for example, in a case where the gNB configures TCI-B as a source of TCI-A for the UE, the beam used for TCI-B may be available as the sensing beam of the beam used for TCI-A.

In addition, for example, the sensing beam corresponding to the transmission beam may be determined according to the beam correspondence.

FIG. 6 is a drawing illustrating an example (1) of a QCL relationship in an embodiment of the present invention. FIG. 6 illustrates an example of DL spatial relation: QCL and TCI. In terms of a signal or a channel assumed to be the similar propagation channel, the following four types are defined for QCL.

Type A: Doppler shift, Doppler spread, average delay, delay spread
Type B: Doppler shift, Doppler spread
Type C: Doppler shift, average delay
Type D: Spatial reception parameter (spatial Rx parameter)

QCL is defined according to a resource and a target. In FIG. 6, arrows directed from a target to a source are illustrated. As illustrated in FIG. 6, the type A and D source DMRS of (Demodulation reference signal) is TRS (Tracking reference signal). The type A and D source of DMRS is TRS. The type A and type D source of CSI-RS (Channel state information reference signal) is TRS. Alternatively, the type C source of CSI-RS may be TRS. The type A and D source of CSI-RS is SSB. Alternatively, the type C and D source of CSI-RS is SSB. The type C and D source of TRS is SSB.

Figure 7:
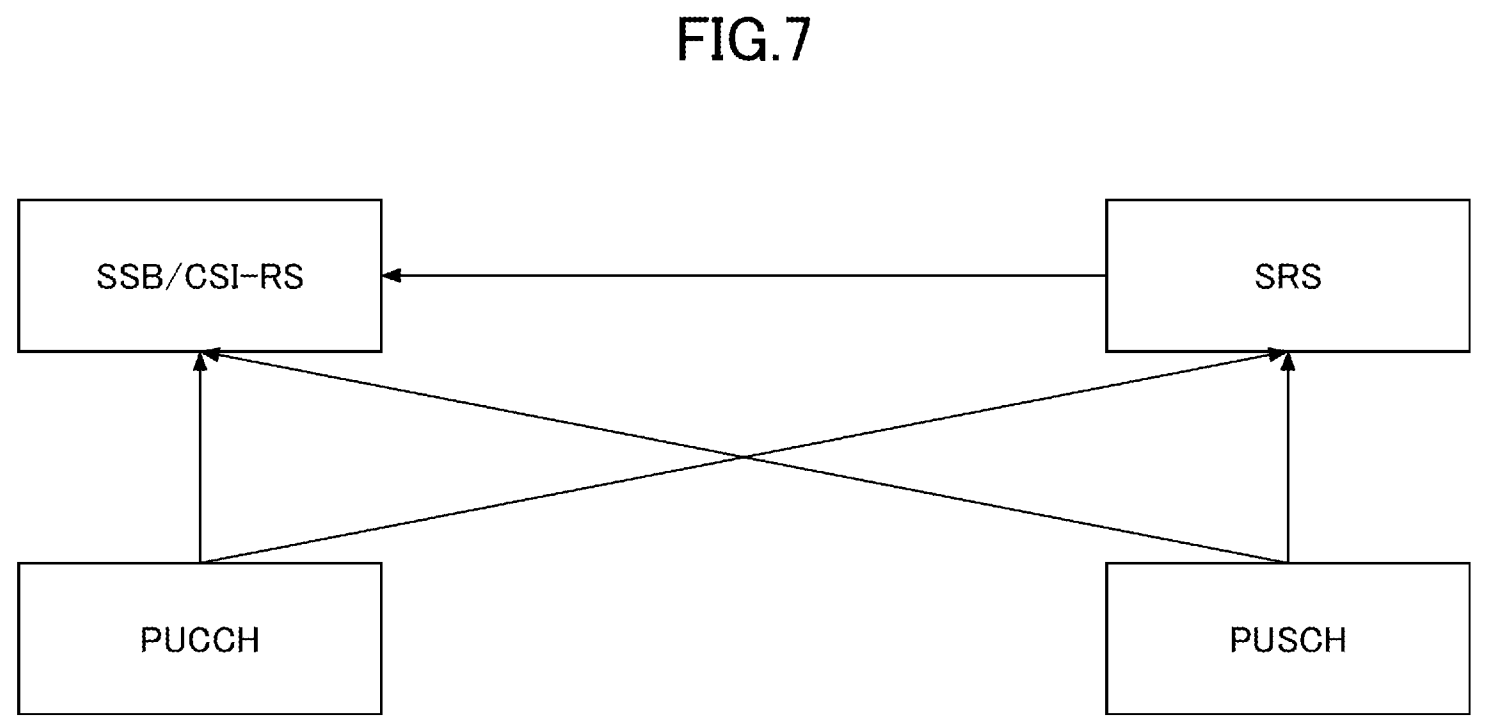

FIG. 7 is a drawing illustrating an example (2) of a QCL relationship in an embodiment of the present invention. In FIG. 7, arrows directed from a target to a source are illustrated. As illustrated in FIG. 7, the source of PUSCH is SRS, and is also SSB/CSI-RS. The source of PUCCH is SRS, and is also SSB/CSI-RS. The source of SRS is SSB/CSI-RS. Note that the source of PUSCH may be SRS in a case of codebook based transmission, and may be CSI-RS associated with SRS in a case of non-codebook based transmission.

Here, in a case where the QCL/TCI framework is enhanced, it is necessary to define how to determine the spatial filter to be applied to the sensing beam for LBT.

Figure 8:
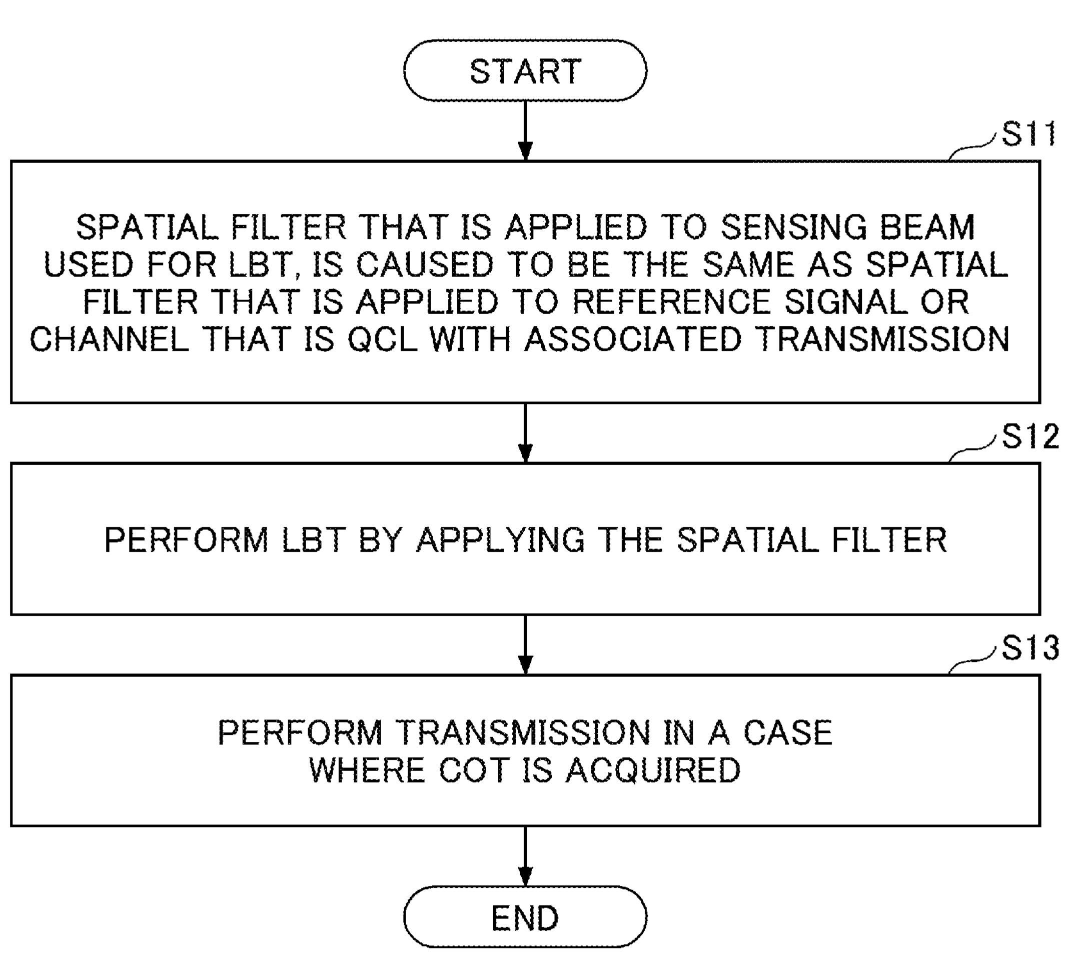
FIG. 8 is a flowchart illustrating an example of channel access in an embodiment of the present invention.

FIG. 8 is a flowchart illustrating an example of channel access in an embodiment of the present invention. In step S11, the base station 10 or the terminal 20 may determine that the spatial filter that is applied to the sensing beam used for LBT is the same as the spatial filter that is applied to the reference signal or channel that is QCL with the associated transmission. In subsequent step S12, the base station 10 or the terminal 20 performs LBT using the sensing beam obtained by applying the spatial filter. In subsequent step S13, the base station 10 or the terminal 20 performs transmission in a case where COT is acquired.

The above-described associated transmission may be, for example, a reference signal or a channel to be transmitted in the COT acquired by the LBT.

The same beamforming gain can be obtained between the sensing and the transmission by performing the operation illustrated in FIG. 8, and thus, there is no need to consider changing of the energy detection threshold value depending on the beamforming gain of the sensing beam.

In a case where the associated transmission is PDSCH, the spatial filter to be applied to the sensing beam to be used for the corresponding LBT may be the same spatial filter as that of the reference signal or channel that is QCL with the PDSCH.

The reference signal or channel that is QCL with the PDSCH may be at least one of the following 1) to 3).

1) CSI-RS resource included in the parameter, NZP-CSI-RS-ResourceSet
2) CSI-RS resource included in NZP-CSI-RS-ResourceSet in which an upper layer parameter trs info is configured.
3) SSB Instead of the reference signal or channel that is QCL with the PDSCH, the spatial filter described in 1) and 2) below, may be applied to the sensing beam in a case where a predetermined condition is satisfied.

1) The spatial filter that is applied to a reference signal or channel that is QCL with PDCCH scheduling the PDSCH.
2) The default spatial filter. For example, the spatial filter applied to PDCCH that is QCL indicated by CORESET (Control resource set) associated with a search space to be monitored with the lowest controlResourceSetId in the latest slot.

The above-described predetermined condition may be a case in which the time offset between the PDSCH reception and the corresponding DCI is less than a threshold value. The threshold value may be determined by RRC or MAC signaling, or may be specified by the specifications in advance.

In a case where the associated transmission is PDCCH, the spatial filter to be applied to the sensing beam to be used for the corresponding LBT may be the same spatial filter as that of the reference signal or channel that is QCL with the PDCCH.

The reference signal or channel that is QCL with the PDCCH may be at least one of the following 1) to 3).

1) CSI-RS resource included in the parameter, NZP-CSI-RS-ResourceSet
2) CSI-RS resource included in NZP-CSI-RS-ResourceSet in which an upper layer parameter trs info is configured.
3) SSB Instead of the reference signal or channel that is QCL with the PDCCH, the spatial filter described in 1) and 2) below, may be applied to the sensing beam in a case where a predetermined condition is satisfied.

1) The spatial filter that is applied to a reference signal or channel that is QCL with the PDCCH.
2) The default spatial filter. For example, the spatial filter applied to PDCCH that is QCL indicated by CORESET (Control resource set) associated with a search space to be monitored with the lowest controlResourceSetId in the latest slot.

In a case where the associated transmission is CSI-RS, the spatial filter to be applied to the sensing beam to be used for the corresponding LBT may be the same spatial filter as that of the reference signal or channel that is QCL with the CSI-RS. Note that the CSI-RS may mean the CSI-RS resource included in NZP-CSI-RS-ResourceSet.

The reference signal or channel that is QCL with the CSI-RS may be at least one of the following 1) to 3).

1) CSI-RS resource included in the parameter, NZP-CSI-RS-ResourceSet
2) CSI-RS resource included in NZP-CSI-RS-ResourceSet in which an upper layer parameter trs info is configured.
3) SSB Instead of the reference signal or channel that is QCL with the CSI-RS, the spatial filter described in 1)-3) below, may be applied to the sensing beam in a case where a predetermined condition is satisfied.

1) The spatial filter that is applied to a reference signal or channel that is QCL with corresponding PDCCH.
2) The default spatial filter. For example, the spatial filter applied to PDCCH that is QCL indicated by CORESET (Control resource set) associated with a search space to be monitored with the lowest controlResourceSetId in the latest slot.
3) The spatial filter that is applied to another DL signal to which an indicated TCI in the same symbol as the CSI-RS is applied.

In a case where the associated transmission is TRS, the spatial filter to be applied to the sensing beam to be used for the corresponding LBT may be the same spatial filter as that of the reference signal or channel that is QCL with the TRS. Note that the TRS may mean a tracking reference signal. In addition, the TRS may mean the CSI-RS resource included in NZP-CSI-RS-ResourceSet with an upper layer parameter trs info.

The reference signal or channel that is QCL with the TRS may be at least one of the following 1) to 3).

1) CSI-RS resource included in the parameter, NZP-CSI-RS-ResourceSet
2) CSI-RS resource included in NZP-CSI-RS-ResourceSet in which an upper layer parameter trs info is configured.

3) SSB

Instead of the reference signal or channel that is QCL with the TRS, the spatial filter described in 1)-3) below, may be applied to the sensing beam in a case where a predetermined condition is satisfied.

1) The spatial filter that is applied to a reference signal or channel that is QCL with corresponding PDCCH.
2) The default spatial filter. For example, the spatial filter applied to PDCCH that is QCL indicated by CORESET (Control resource set) associated with a search space to be monitored with the lowest controlResourceSetId in the latest slot.
3) The spatial filter that is applied to another DL signal to which an indicated TCI in the same symbol as the TRS is applied.

In a case where the associated transmission is SSB, the spatial filter to be applied to the sensing beam to be used for the corresponding LBT may be the same spatial filter as that of the reference signal or channel that is QCL with the SSB.

The reference signal or channel that is QCL with the SSB may be at least one of the following 1) to 3).

1) CSI-RS resource included in the parameter, NZP-CSI-RS-ResourceSet
2) CSI-RS resource included in NZP-CSI-RS-Resource-Set in which an upper layer parameter trs info is configured.
3) SSB In a case where the associated transmission is PUSCH, the spatial filter to be applied to the sensing beam to be used for the corresponding LBT may be the same spatial filter as that of the reference signal or channel that is QCL with the PUSCH.

The reference signal or channel that is QCL with the PUSCH may be at least one of the following 1) to 4).

1) CSI-RS resource included in the parameter, NZP-CSI-RS-ResourceSet
2) CSI-RS resource included in NZP-CSI-RS-Resource-Set in which an upper layer parameter trs info is configured.
3) SSB
4) SRS Which of the above-described 1) to 4) is to be applied, may be determined based on at least one of the following A) to D).

A) Whether the PUSCH is a codebook based transmission or a non-codebook based transmission.
B) Specified by the specifications in advance.
C) Configured by RRC or MAC signaling.
D) Indicated by DCI.

In addition, the spatial filter that is to be actually applied, may be determined based on at least one of the following A) to D).

A) Whether the PUSCH is a codebook based transmission or a non-codebook based transmission.
B) Specified by the specifications in advance.
C) Configured by RRC or MAC signaling.
D) Indicated by DCI.

Instead of the reference signal or channel that is QCL with the PUSCH, the spatial filter described in 1) and 2) below, may be applied to the sensing beam in a case where a predetermined condition is satisfied.

1) The spatial filter that is applied to a reference signal or channel that is QCL with PDCCH scheduling the PUSCH.
2) The default spatial filter. For example, the spatial filter applied to PDCCH that is QCL indicated by CORESET (Control resource set) associated with a search space to be monitored with the lowest controlResourceSetId in the latest slot.

The above-described predetermined condition may be a case in which the time offset between the PUSCH transmission and the corresponding DCI is less than a threshold value. The threshold value may be determined by RRC or MAC signaling, or may be specified by the specifications in advance.

In a case where the associated transmission is PUCCH, the spatial filter to be applied to the sensing beam to be used for the corresponding LBT may be the same spatial filter as that of the reference signal or channel that is QCL with the PUCCH.

The reference signal or channel that is QCL with the PUCCH may be at least one of the following 1) to 4).

1) CSI-RS resource included in the parameter, NZP-CSI-RS-ResourceSet
2) CSI-RS resource included in NZP-CSI-RS-Resource-Set in which an upper layer parameter trs info is configured.
3) SSB
4) SRS Which of the above-described 1) to 4) is to be applied, may be determined based on at least one of the following A) to C).

A) Specified by the specifications in advance.
B) Configured by RRC or MAC signaling.
C) Indicated by DCI.

In addition, the spatial filter that is to be actually applied, may be determined based on at least one of the following A) to C).

A) Specified by the specifications in advance.
B) Configured by RRC or MAC signaling.
C) Indicated by DCI.

In a case where the associated transmission is SRS, the spatial filter to be applied to the sensing beam to be used for the corresponding LBT may be the same spatial filter as that of the reference signal or channel that is QCL with the SRS.

The reference signal or channel that is QCL with the SRS may be at least one of the following 1) to 4).

1) CSI-RS resource included in the parameter, NZP-CSI-RS-ResourceSet
2) CSI-RS resource included in NZP-CSI-RS-Resource-Set in which an upper layer parameter trs info is configured.
3) SSB
4) SRS Which of the above-described 1) to 4) is to be applied, may be determined based on at least one of the following A) to C).

A) Specified by the specifications in advance.
B) Configured by RRC or MAC signaling.
C) Indicated by DCI.

In addition, the spatial filter that is to be actually applied, may be determined based on at least one of the following A) to C).

A) Specified by the specifications in advance.
B) Configured by RRC or MAC signaling.
C) Indicated by DCI.

In addition, hereinafter, the spatial filter that is applied to the sensing beam corresponding to a plurality of transmissions with different QCLs, will be described below. For example, the spatial filter that is applied to the sensing beam for acquiring COT intended by the transmitter to start a plurality of transmissions according to CDM, TDM, FDM, or the like, may be determined based on the spatial filter to be applied for each transmission. For example, the determination may be performed based on at least one of the following 1) to 3).

1) QCL types that can be applied to the sensing beam for LBT may be defined.
2) The relationship between the QCL applied to the sensing beam for LBT and the QCL applied to the transmission may be defined.
3) The specifications may specify that the determination is performed based on the spatial filter used for the transmission corresponding to the sensing beam.

Note that which of the operations of the above-described embodiments is to be performed may be selected according to the RRC configuration, MAC-CE indication, DCI indication, and the combinations thereof.

Note that each of the operations of the above-described embodiments may be applied to a case where the frequency band is from 52.6 GHz to 71 GHZ, may be applied to a case where the frequency band is an unlicensed band, may be applied to a case of a specific subcarrier spacing, or may be applied to a combination thereof.

Note that QCL may mean one of the type A, type B, type C and type D.

Note that each of the operations of the above-described embodiments may be applied to each cell, may be applied to each bandwidth, or may be applied to each BWP.

The LBT may be the type 1 LBT, that is, the sensing with back-off, or may be the type 2 LBT, that is, the sensing with fixed duration.

The UE capability indicating whether or not each of the operations of the above-described embodiments is supported may be defined, and the UE capability may be reported from the UE to the gNB.

According to the above-described embodiments, the base station 10 and the terminal 20 can determine the spatial filter to be applied to the sensing for LBT, based on the spatial filter to be applied to the signal or channel that is transmitted after COT is acquired.

That is, the sensing beam to be applied to LBT (Listen before talk) can be determined in the wireless communication system.

(Apparatus Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only some of the functions in an embodiment.

<Base Station 10>

Figure 9:
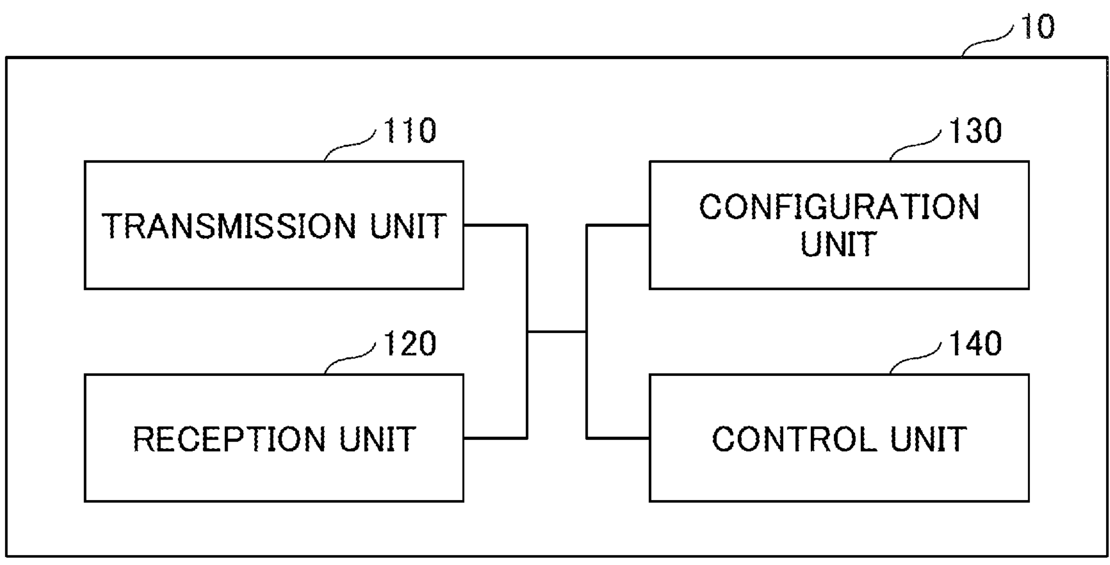
FIG. 9 is a drawing illustrating an example of a functional structure of a base station 10 in an embodiment of the present invention.

FIG. 9 is a drawing illustrating an example of a functional structure of a base station 10 according to an embodiment of the present invention. As shown in FIG. 9, the base station 10 includes a transmission unit 110, a reception unit 120, a configuration unit 130, and a control unit 140. The functional structure illustrated in FIG. 9 is merely an example. Functional divisions and names of functional units may be anything as long as operations according to an embodiment of the present invention can be performed.

The transmission unit 110 includes a function for generating a signal to be transmitted to the terminal 20 side and transmitting the signal wirelessly. Further, the transmission unit 110 transmits an inter-network-node message to another network node. The reception unit 120 includes a function for receiving various signals transmitted from the terminal 20 and acquiring, for example, information of a higher layer from the received signals. Further, the transmission unit 110 has a function to transmit NR-PSS, NR-SSS, NR-PBCH, DL/UL control signals, and the like to the terminal 20. Further, the reception unit 120 receives an inter-network-node message from another network node.

The configuration unit 130 stores preset information and various configuration information items to be transmitted to the terminal 20. Contents of the configuration information are, for example, information related to the channel access configuration.

The control unit 140 performs control related to the channel access configuration as described in the embodiments. Further, the control unit 240 controls LBT. In addition, the control unit 140 performs scheduling. The functional units related to signal transmission n the control unit 140 may be included in the transmission unit 110, and the functional units related to signal reception in the control unit 140 may be included in the reception unit 120.

<Terminal 20>

Figure 10:
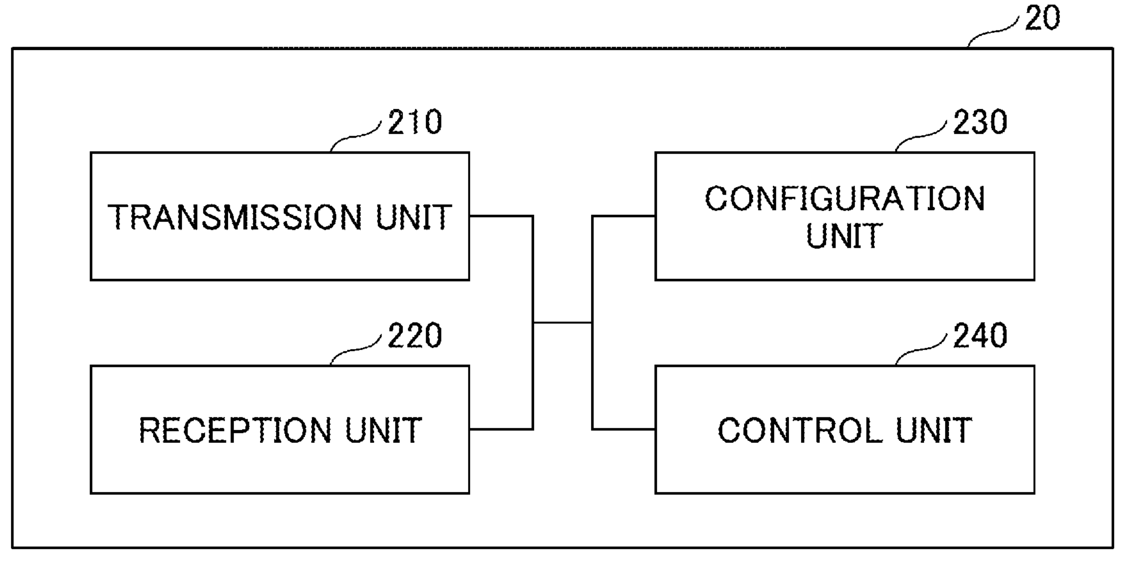
FIG. 10 is a drawing illustrating an example of a functional structure of a terminal 20 in an embodiment of the present invention.

FIG. 10 is a drawing illustrating an example of a functional structure of a terminal 20 according to an embodiment of the present invention. As shown in FIG. 10, the terminal 20 includes a transmission unit 210, a reception unit 220, a configuration unit 230, and a control unit 240. The functional structure illustrated in FIG. 10 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL/SL control signals, etc., transmitted from the base station 10. Further, for example, with respect to the D2D communications, the transmission unit 210 transmits, to another terminal 20, PSCCH (Physical Sidelink Control Channel), PSSCH (Physical Sidelink Shared Channel), PSDCH (Physical Sidelink Discovery Channel), PSBCH (Physical Sidelink Broadcast Channel), etc., and the reception unit 220 receives, from the another terminal 20, PSCCH, PSSCH, PSDCH, or PSBCH.

The configuration unit 230 stores various configuration information items received by the reception unit 220 from the base station 10. In addition, the configuration unit 230 also stores pre-configured configuration information. Contents of the configuration information are, for example, information related to the channel access configuration.

The control unit 240 performs control related to the channel access configuration as described in the embodiments. Further, the control unit 240 controls LBT. The functional units related to signal transmission in the control unit 240 may be included in the transmission unit 210, and the functional units related to signal reception in the control unit 240 may be included in the reception unit 220.

(Hardware Structure)

In the above functional structure diagrams used for describing an embodiment of the present invention (FIG. 9 and FIG. 10), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming; broadcasting, notifying, communicating, forwarding, configuring, reconfiguring, allocating, mapping, and assigning, etc. For example, a functional block (component) that functions to transmit is called a transmitting unit or a transmitter. In either case, as described above, the implementation method is not particularly limited.

Figure 11:
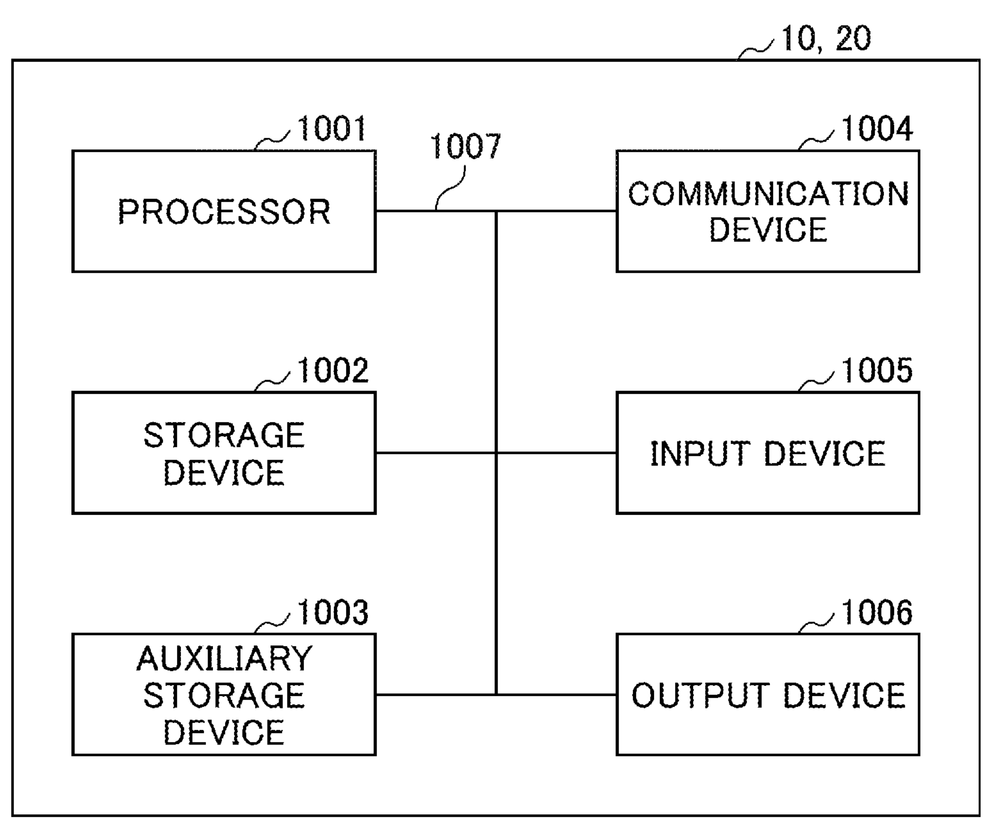
FIG. 11 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 11 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 9 may be realized by control programs that are stored in the storage device 1002 and are executed by the processor 1001. Further, for example, the control unit 240 of the terminal 20 illustrated in FIG. 10 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via at least one of a wired network and a wireless network, and may be referred to as a network device, a network controller, a network card, a communication module, etc. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the may like, be implemented by the communication device 1004. The transmitting/receiving unit may be physically or logically divided into a transmitting unit and a receiving unit.

The input device 1005 is an input device that an receives external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a terminal is provided. The terminal includes: a reception unit that performs LBT (Listen before talk); a transmission unit that performs transmission within COT (Channel Occupancy Time) acquired based on a result of the LBT; and a control unit that determines a spatial filter to be applied to a sensing beam used for the LBT, based on a spatial filter to be applied to the transmission.

According to the above-described configuration, the terminal 20 can determine the spatial filter to be applied to the sensing for LBT, based on the spatial filter to be applied to the signal or channel that is transmitted after COT is acquired. That is, the sensing beam to be applied to LBT (Listen before talk) can be determined in the wireless communication system.

In a case where the transmission is a downlink shared channel or a downlink control channel, the control unit determines a spatial filter to be applied to a CSI-RS (Channel state information reference signal) resource that is QCL (Quasi-co-location) with the downlink shared channel or the downlink control channel as a spatial filter to be applied to the sensing beam used for the LBT. According to the configuration, the terminal 20 can determine the spatial filter to be applied to the sensing for LBT, based on the spatial filter to be applied to the signal or channel that is transmitted after COT is acquired.

In a case where the transmission is a downlink shared channel, the control unit determines a spatial filter to be applied to a CSI-RS (Channel state information reference signal) resource that is QCL (Quasi-co-location) with a downlink control channel for scheduling the downlink shared channel, as a spatial filter to be applied to the sensing for beam used the LBT. According the to configuration, the terminal 20 can determine the spatial filter to be applied to the sensing for LBT, based on the spatial filter to be applied to the signal or channel that is transmitted after COT is acquired.

In a case where the transmission is an uplink shared channel or an uplink control channel, the control unit determines a spatial filter to be applied to a CSI-RS (Channel state information reference signal) resource that is QCL (Quasi-co-location) with the uplink shared channel or the uplink control channel, as a spatial filter to be applied to the sensing beam used for the LBT. According to the configuration, the terminal 20 can determine the spatial filter to be applied to the sensing for LBT, based on the spatial filter to be applied to the signal or channel that is transmitted after COT is acquired.

In a case where the transmission is CSI-RS (Channel state information reference signal), TRS (Tracking reference signal), or SSB (SS/PBCH block), the control unit determines a spatial filter to be applied to a CSI-RS (Channel state information reference signal) resource that is QCL (Quasi-co-location) with the CSI-RS, TRS, or SSB, as a spatial filter to be applied to the sensing beam used for the LBT. According to the configuration, the terminal 20 may determine the spatial filter to be applied to the sensing for LBT, based on the spatial filter to be applied to the signal or channel that is transmitted after COT is acquired.

In addition, according to an embodiment of the present invention, a communication method performed by a terminal is provided. The communication method includes: performing LBT (Listen before talk); performing transmission within COT (Channel Occupancy Time) acquired based on a result of the LBT; and determining a spatial filter to be applied to a sensing beam used for the LBT, based on a spatial filter to be applied to the transmission.

According to the above-described configuration, the terminal 20 can determine the spatial filter to be applied to the sensing for LBT, based on the spatial filter to be applied to the signal or channel that is transmitted after COT is acquired. That is, the sensing beam to be applied to LBT (Listen before talk) can be determined in the wireless communication system.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another (as item long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information indication may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), 802.11 IEEE (Wi-Fi (registered trademark)), IEEE 802. 16 (WiMAX (registered trademark)), IEEE 802.20, UWB (Ultra-WideBand), Bluetooth (registered trademark), and other appropriate systems, and a next generation system enhanced therefrom. Further, multiple systems may also be applied in combination (e.g., at least one of LTE and LTE-A combined with 5G, etc.).

The order processing steps, sequences, of flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For in the software example, case where is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms "Base Station (BS)", "Radio Base Station", "Base Station Apparatus", "Fixed Station", "NodeB", "eNodeB (eNB)", "gNodeB (gNB)", "Access Point", "Transmission Point" "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Further, the user terminal in the present disclosure may be read as the base station. In this case, the function of the user terminal described above may be provided by the base station.

The term "determining" used in the present specification may include various actions or operations. The "determining" may include, for example, a case in which "judging", "calculating", "computing", "processing", "deriving", "investigating", "looking up, search, inquiry" (e.g., looking up a table, database, or other data structures), or "ascertaining" is deemed as "determining". Further, the "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "base on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts," "circuits," "devices," etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols, SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a subslot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols included in a slot or mini slot, the number of and RBs subcarriers included in a RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, term "A and B are different" may mean "A and B are different from each other." It should be noted that the term "A and B are different" may mean "A and B are different from C." Terms such as "separated" or "combined" may be interpreted in the same way as the above-described "different".

An aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

The present application is based on and claims priority to Japanese patent application No. 2021-086290 filed on May 21, 2021, the entire contents of which are hereby incorporated herein by reference.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a receiver configured to LBT (Listen Before Talk);

a transmitter configured to perform transmission within a COT (Channel Occupancy Time) acquired based on a result of the LBT; and a controller configured to determine a spatial filter to be applied to the LBT based on a spatial filter to be applied to the transmission, wherein the spatial filter applied to the LBT is indicated by a Radio Resource Control (RRC) signaling and is applied to a reference signal that is Quasi-co-location (QCL) with an uplink control channel in a case that the transmission is performed on the uplink control channel, and wherein the spatial filter applied to the LBT is indicated by a Downlink Control Information (DCI) signaling and is applied to a Sounding Reference Signal (SRS) that is Quasi-co-location (QCL) with an uplink shared channel in a case that the transmission is performed on the uplink shared channel.

2. The terminal according to claim 1, wherein in a case where the transmission is a downlink shared channel or a downlink control channel, the controller determines a spatial filter to be applied to a CSI-RS (Channel state information reference signal) resource that is a Quasi-co-location (QCL)

with the downlink shared channel or the downlink control channel as a spatial filter to be applied to the LBT.

3. The terminal according to claim 1, wherein in a case where the transmission is a downlink shared channel, the controller determines a spatial filter to be applied to a CSI-RS (Channel state information reference signal) resource which is a Quasi-co-location (QCL) with a downlink control channel for scheduling the downlink shared channel, as a spatial filter to be applied to the LBT.

4. The terminal according to claim 1, wherein in a case where the transmission is an uplink shared channel or an uplink control channel, the controller determines a spatial filter to be applied to a CSI-RS (Channel state information reference signal) resource that is a Quasi-co-location (QCL) with the uplink shared channel or the uplink control channel, as a spatial filter to be applied to the LBT.

5. The terminal according to claim 1, wherein in a case where the transmission is a CSI-RS (Channel state information reference signal), a TRS (Tracking reference signal), or an SSB (SS/PBCH block), the controller determines a spatial filter to be applied to a CSI-RS (Channel state information reference signal) resource that is a QCL (Quasi-co-location) with the CSI-RS, TRS, or SSB, as a spatial filter to be applied to the LBT.

6. A communication method to be performed by a terminal, the method comprising:

performing LBT (Listen Before Talk);

performing transmission within a COT (Channel Occupancy Time) acquired based on a result of the LBT; and determining a spatial filter to be applied to the LBT based on a spatial filter to be applied to the transmission, wherein the spatial filter applied to the LBT is indicated by a Radio Resource Control (RRC) signaling and is applied to a reference signal that is Quasi-co-location (QCL) with an uplink control channel in a case that the transmission is performed on the uplink control channel, and wherein the spatial filter applied to the LBT is indicated by a Downlink Control Information (DCI) signaling and is applied to a Sounding Reference Signal (SRS) that is Quasi-co-location (QCL) with an uplink shared channel in a case that the transmission is performed on the uplink shared channel.

* * * * *